(12) United States Patent
Blose et al.

(10) Patent No.: US 8,396,304 B2
(45) Date of Patent: Mar. 12, 2013

(54) USING HANDWRITTEN NOTATIONS IN DIGITAL VIDEO PRESENTATIONS

(75) Inventors: Andrew C. Blose, Penfield, NY (US); Andrew C. Gallagher, Fairport, NY (US); Joseph A. Manico, Rochester, NY (US); Charles L. Parker, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 328 days.

(21) Appl. No.: 12/826,805

(22) Filed: Jun. 30, 2010

(65) Prior Publication Data

US 2012/0002889 A1   Jan. 5, 2012

(51) Int. Cl.
*G06K 9/72* (2006.01)

(52) U.S. Cl. ......... 382/229; 382/180

(58) Field of Classification Search ......... 382/180, 382/229
See application file for complete search history.

(56) References Cited

U.S. PATENT DOCUMENTS

| | | | |
|---|---|---|---|
| 5,307,422 A | 4/1994 | Wang | |
| 5,751,849 A * | 5/1998 | Ikeda | 382/176 |
| 6,567,103 B1 * | 5/2003 | Chaudhry | 715/738 |
| 6,639,649 B2 | 10/2003 | Fredlund et al. | |
| 6,745,186 B1 * | 6/2004 | Testa et al. | 707/737 |
| 6,865,297 B2 | 3/2005 | Loui | |
| 7,072,514 B1 | 7/2006 | Thouin | |
| 7,298,920 B2 * | 11/2007 | Zuniga | 382/290 |
| 8,036,417 B2 * | 10/2011 | Gallagher et al. | 382/100 |
| 8,131,081 B2 * | 3/2012 | Morohoshi | 382/187 |
| 2004/0128691 A1 * | 7/2004 | Egawa et al. | 725/88 |
| 2007/0250529 A1 | 10/2007 | Beato et al. | |
| 2007/0250532 A1 | 10/2007 | Beato et al. | |
| 2009/0094518 A1 | 4/2009 | Lawther et al. | |
| 2009/0310814 A1 | 12/2009 | Gallagher et al. | |
| 2010/0103463 A1 * | 4/2010 | Joshi et al. | 358/1.16 |
| 2010/0118115 A1 * | 5/2010 | Takahashi et al. | 348/24 |
| 2010/0289739 A1 * | 11/2010 | Tamura et al. | 345/156 |
| 2011/0026825 A1 * | 2/2011 | Chaudhuri et al. | 382/170 |

OTHER PUBLICATIONS

Gonzalez et al, Digital Image Processing, Prentice Hall, 2002, pp. 567-626.
Dehkordi et al, Prediction of Handwriting Legibility, 6th International Conf. on Document Analysis and Recognition Processing, pp. 997-1001, Sep. 2001.

* cited by examiner

*Primary Examiner* — Samir Ahmed
*Assistant Examiner* — Totam Le
(74) *Attorney, Agent, or Firm* — Raymond L. Owens (57) ABSTRACT

A method for producing a slide show video from a collection of hardcopy media, the method includes digitizing the media and detecting handwritten information and estimating the age of the media; determining an order of presentation for the slide show video based on the detected handwritten information and estimated ages; and producing a slide show video from the hardcopy media using the determined order of presentation.

7 Claims, 6 Drawing Sheets

USING HANDWRITTEN NOTATIONS IN DIGITAL VIDEO PRESENTATIONS

FIELD OF THE INVENTION

This invention relates to scanning hardcopy media to acquire digital versions of images and handwritten notations and using these records to create digital video presentations.

BACKGROUND OF THE INVENTION

Many photographs contain handwritten information in addition to the image information. Often this handwritten information is highly useful, interesting, emotional, or has historic significance. In some cases the handwritten notation associated with the print can be more interesting or emotionally valuable than the image itself. In addition the handwritten notation provides a personal narrative context for the image. It is often desirable to make copies of these photographs to create replica prints. The front and back of loose photographic prints can be scanned to obtain digital records of images and handwritten notations which can appear on either surface of the photographic print. Once these digital records are obtained they can be used to create new image products such as reprints, bound photo albums, postcards, greeting card, mugs, t-shirts, videos, movies, animations, slide shows and the like.

Existing document scanning devices such as the Kodak i1220 and i1440 can simultaneously scan both sides of a photograph conveniently providing content from each side in digital form. These scanners are capable of scanning large numbers of prints which enables users to scan large quantities of photographs which in turn creates a multitude of digital files.

Once a user has converted their hardcopy media collection, containing images and handwritten information, into a digital form, new presentation modalities can be provided. Once such presentation modality is a video slide show including a series images presented in a predetermined or random sequence. Typically images are presented in a chronological sequence determined by time/date metadata associated with each image in a sequence. When time/date metadata is unavailable, such as with scanned hardcopy media, the presentation sequence determined by the user, or in a random sequence is used. In addition, the duration of time in which each image is presented is typically a user selectable option and once chosen, the display duration time is used for presenting all images in the presentation. It is well known to produce video slide shows from digital images and many automated organization and presentation techniques have been demonstrated. One such technique is taught in U.S. Pat. No. 6,639,649B2, presents images for different durations that coordinate to the beat of accompanying music. U.S. Pat. No. 6,865,297B2 uses time differences between a plurality of images to cluster images into discrete events. These events are then used to create chapters on an optical disk making a navigable series of video slide shows. Pending U.S. Patent Application Publication No. 20090094518A1 automatically determines a "image value" which is used to assign a "emphasis score" which is then used to control the relative presentation of images. Images are moved relative to each other in a manner that attracts more attention to images having a higher emphasis score than images having a lower emphasis score. The relationship between images and their associated handwritten information are not considered for use in determining the presentation modalities of video slide shows in these prior art techniques.

Software applications such as Microsoft Powerpoint® are often used by typical consumers to create presentations containing digital images. Consumers can specify the order and control the presentation time of the digital images. Software applications such as and muvee Reveal™ can automatically set the presentation time of the digital content to be synchronized with music. Again, the relationship between images and their associated handwritten information are not considered for use in determining the presentation modalities of video slide shows in these prior art techniques.

SUMMARY OF THE INVENTION

The above-described problem(s) is/are addressed and a technical solution is achieved in the art by a system and a method for detecting and producing a slide show video from a collection of hardcopy media. In one embodiment of the invention a method is described for producing a slide show video from a collection of hardcopy media, comprising:

(a) using a scanner to scan the image sides and the non-image sides of a plurality of hardcopy media from the collection of hardcopy media to produce a collection of digital images of image sides and a corresponding collection of digital images of non-image sides;

(b) using a processor to detect handwritten information on at least one hardcopy medium by analyzing the digital image of image sides and the digital images of non-image sides;

(c) using the processor to automatically determine an order of presentation for the slide show video of the digital images of image sides and the digital images of non-image sides, based on the detected handwritten information; and (d) producing a slide show video from the digital images of the image sides and the digital images of non-image sides using the determined order of presentation.

In another embodiment of the invention a method is described for producing a slide show video from a collection of hardcopy media, comprising:

(a) using a scanner to scan the image sides and the non-image sides of a plurality of hardcopy media from the collection of hardcopy media to produce a collection of digital images of image sides and a corresponding collection of digital images of non-image sides;

(b) using a processor to estimate the age of at least one hardcopy medium by analyzing the digital images of image sides and the digital images of non-image sides;

(c) using the processor to automatically determine an order of presentation for the slide show video of the digital images of image sides and the digital images of non-image sides, based on the estimated ages; and (d) producing a slide show video from the digital images of the image sides and the digital images of non-image sides using the determined order of presentation.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION OF THE INVENTION

The present invention discloses a method and system that produces a slide show video from a collection of hardcopy media.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

The phrase, "digital content record", as used herein, refers to any digital content record, such as a digital still image, a digital audio file, or a digital video file.

It should be noted that, unless otherwise explicitly noted or required by context, the word "or" is used in this disclosure in a non-exclusive sense.

Figure 1:
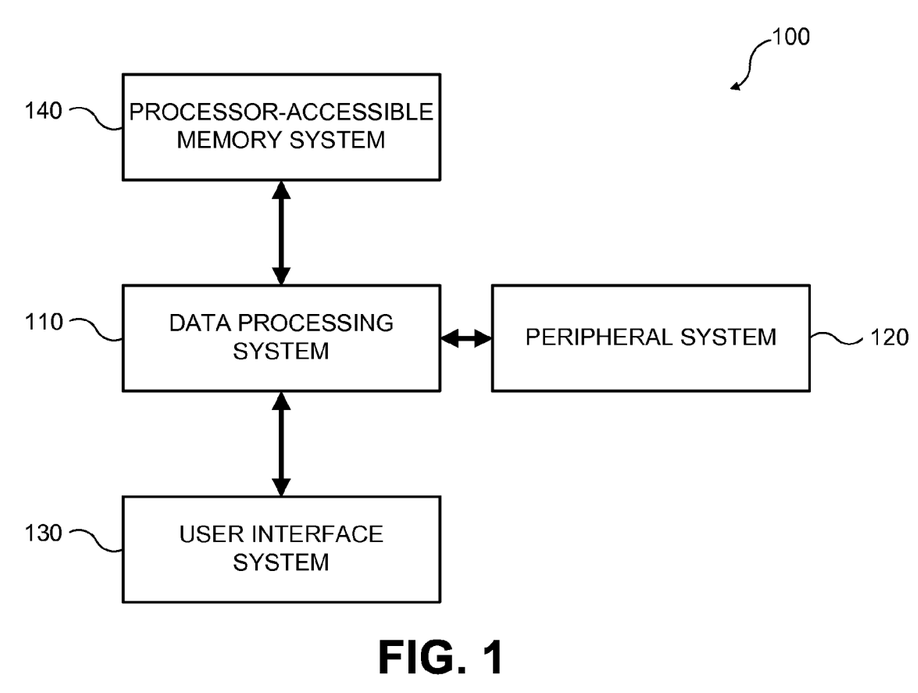
FIG. 1 illustrates a system for practicing the various methods of producing a slide show video from a collection of hardcopy media, according to an embodiment of the present invention.

FIG. 1 illustrates a system 100 for producing a slide show video from a collection of hardcopy media, according to an embodiment of the present invention. The system 100 includes a data processing system 110, a peripheral system 120, a user interface system 130, and a processor-accessible memory system 140. The processor-accessible memory system 140, the peripheral system 120, and the user interface system 130 are communicatively connected to the data processing system 110.

Figure 2:
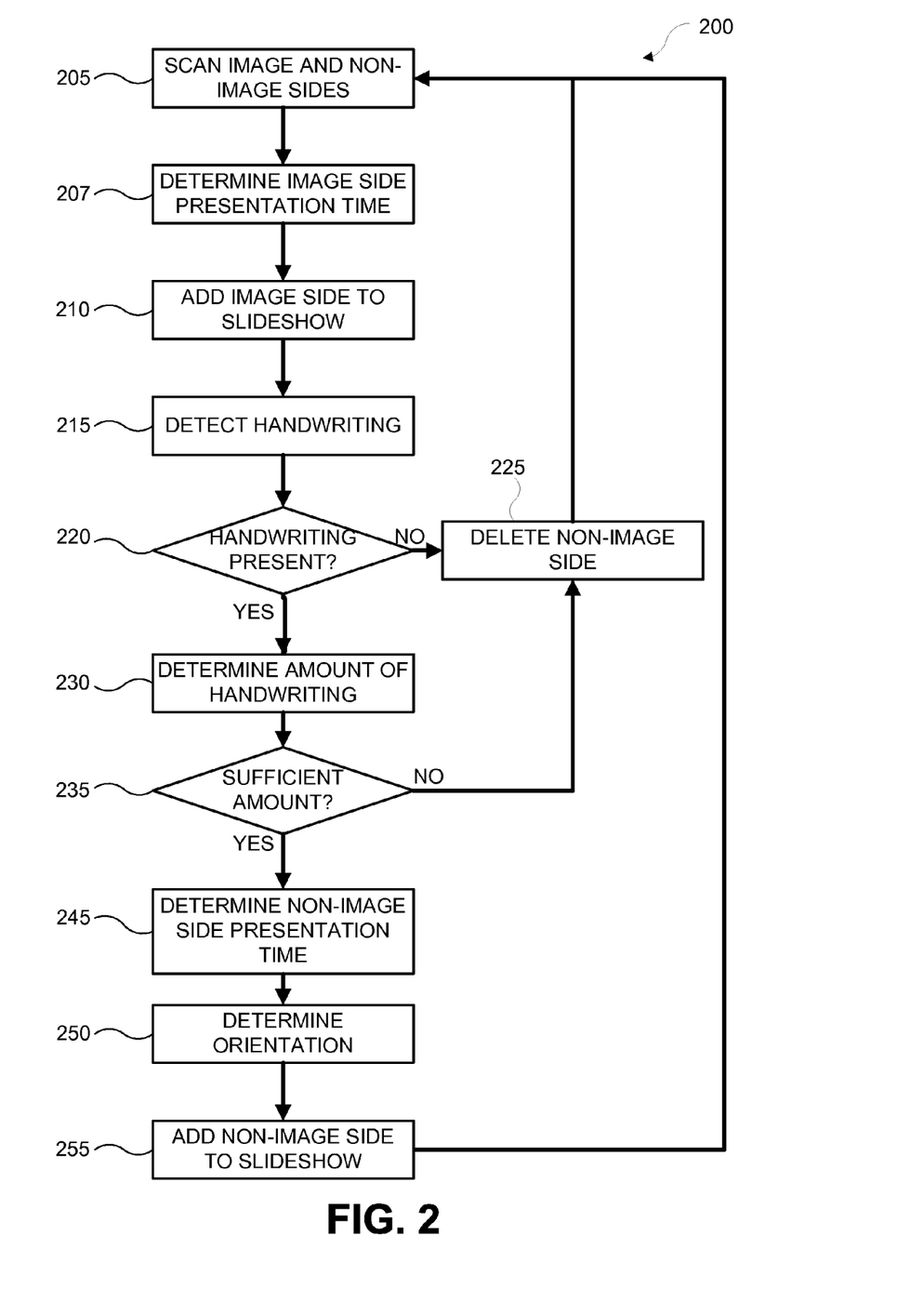
FIG. 2 illustrates a method for practicing the various methods of producing a slide show video from a collection of hardcopy media, according to an embodiment of the present invention.

The data processing system 110 includes one or more data processing devices that implement the processes of the various embodiments of the present invention, including the example process of FIG. 2 described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The processor-accessible memory system 140 includes one or more processor-accessible memories configured to store information, including the information needed to execute the processes of the various embodiments of the present invention, including the example process of FIG. 2 described herein. The processor-accessible memory system 140 can be a distributed processor-accessible memory system including multiple processor-accessible memories communicatively connected to the data processing system 110 via a plurality of computers or devices. On the other hand, the processor-accessible memory system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. Further, the phrase "communicatively connected" is intended to include a connection between devices or programs within a single data processor, a connection between devices or programs located in different data processors, and a connection between devices not located in data processors at all. In this regard, although the processor-accessible memory system 140 is shown separately from the data processing system 110, one skilled in the art will appreciate that the processor-accessible memory system 140 can be stored completely or partially within the data processing system 110. Further in this regard, although the peripheral system 120 and the user interface system 130 are shown separately from the data processing system 110, one skilled in the art will appreciate that one or both of such systems can be stored completely or partially within the data processing system 110.

The peripheral system 120 can include one or more devices configured to provide digital content records to the data processing system 110. For example, the peripheral system 120 can include digital video cameras, cellular phones, regular digital cameras, or other data processors. The data processing system 110, upon receipt of digital content records from a device in the peripheral system 120, can store such digital content records in the processor-accessible memory system 140.

The user interface system 130 can include a mouse, a keyboard, another computer, or any device or combination of devices from which data is input to the data processing system 110. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the data processing system 110. In this regard, if the user interface system 130 includes a processor-accessible memory, such memory can be part of the processor-accessible memory system 140 even though the user interface system 130 and the processor-accessible memory system 140 are shown separately in FIG. 1.

Figure 3:
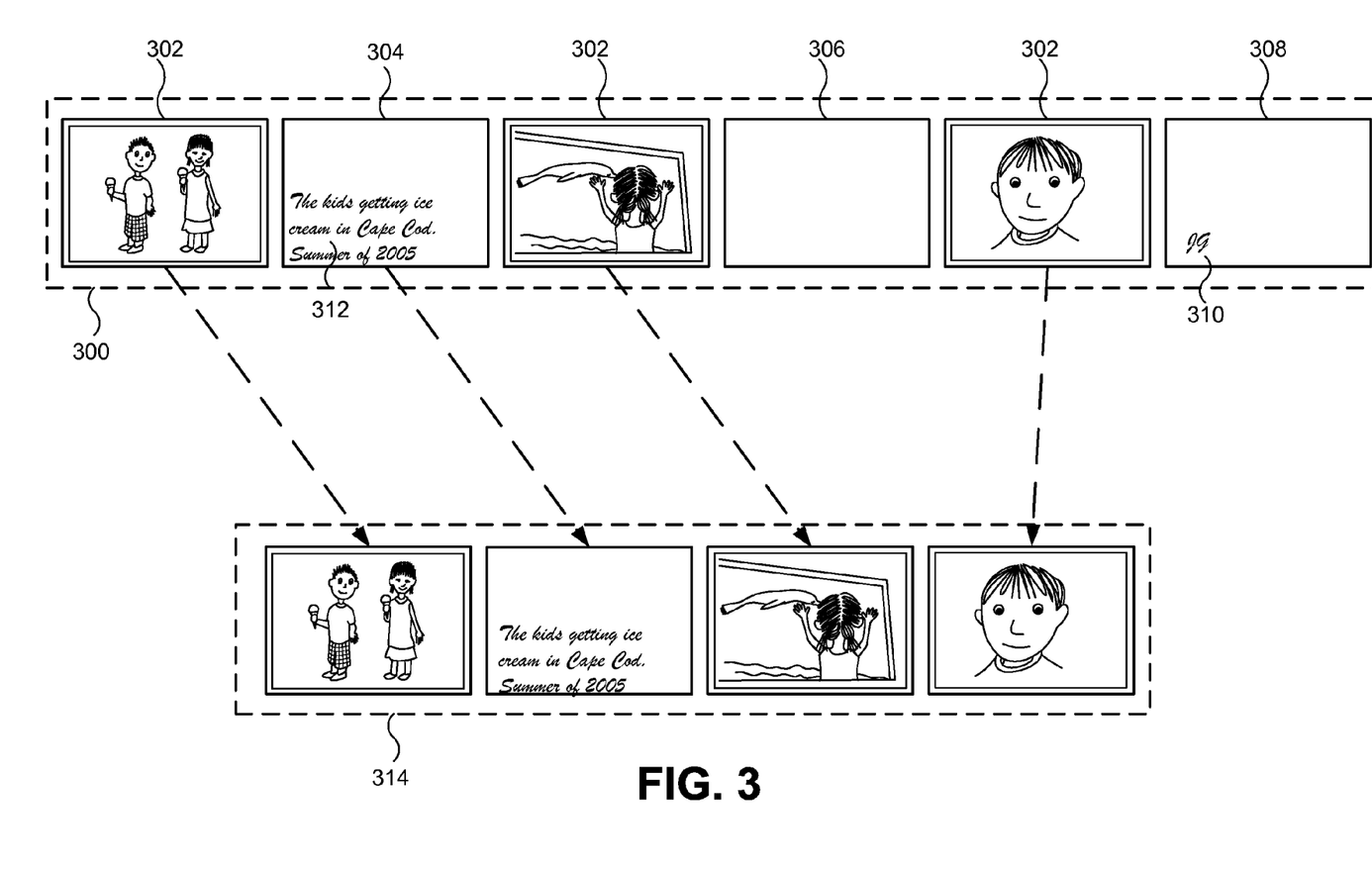
FIG. 3 illustrates the digital images in an example collection of hardcopy media and the collection of digital images in the slide show video.
Figure 6:
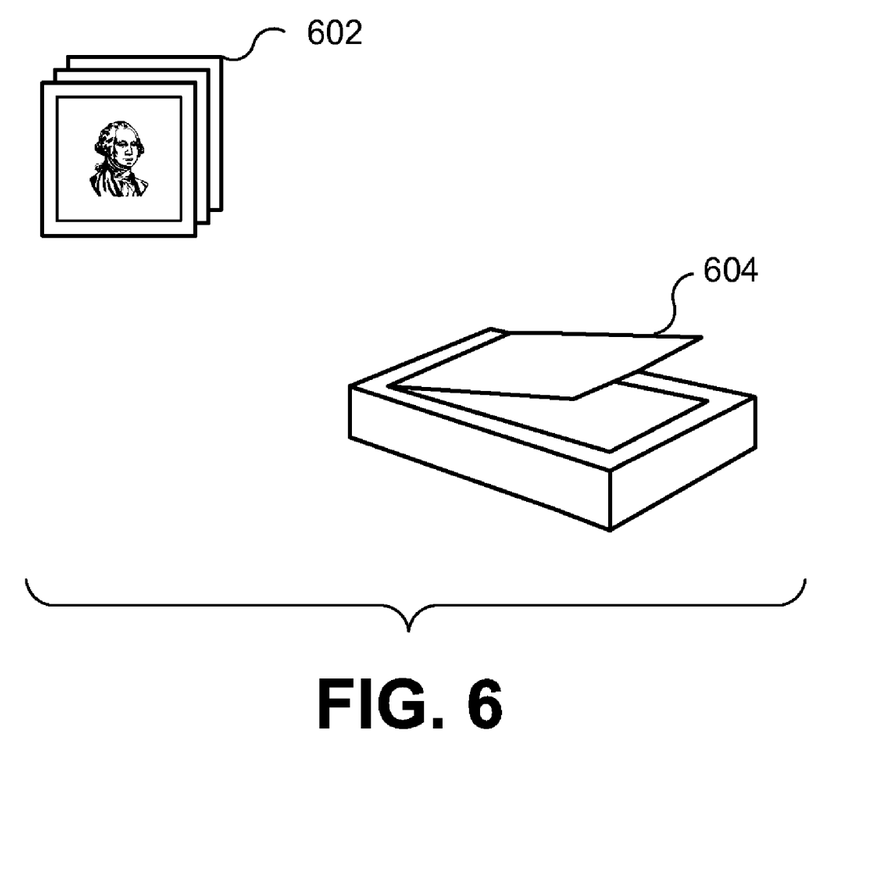
FIG. 6 illustrates a practical example upon which the method of FIG. 2 is executed, according to an embodiment of the present invention.

FIG. 2 illustrates a method 200 for producing a slide show video from a collection of hardcopy media, according to the preferred embodiment of the present invention. FIG. 3 illustrates the digital images being processed by method 200. The present invention will now be described with reference to FIG. 2, FIG. 3 and FIG. 6. There is shown a method 200 illustrating how handwritten information from hardcopy medium is detected and used to determine the content and order of a slide show presentation (alternatively called "presentation order" or "order of presentation"). There is also shown a diagram of a practical example of an embodiment of the present invention. Access to digital images of the front and back sides of a hardcopy medium are obtained in step 205 by scanning each side of hardcopy media 602 with a scanner 604 to acquire a scan of an image side 302 of each hardcopy medium 602 and a scan of the non-image side 304, 306, 308 of each hardcopy medium 602. The set of digitized image and non-image sides 300 are processed by the steps in method 200. In step 207 the presentation time for the digital image of the digitized image side 302 of the hardcopy media 602 is determined. In some embodiments of the present invention, a default presentation time can be used. A new presentation time can be determined by shortening or lengthening the default time. One method for determining the new presentation time can be based on the estimated age of the scanned hardcopy media. U.S. Patent Application Publication Nos. 20090310814A1 and 20070250532A1 teach methods for estimating the date of scanned hardcopy media. In some embodiments of the present invention, older hardcopy media can be more interesting than newer. In this case, longer presentation times can be used for digital images associated with older hardcopy media 602. Other methods of determining the new presentation time can include the number of faces in the image and the color type of the time (black-and-white or color), or the aesthetic quality or appeal of the digital images of image sides of hardcopy media.

In step 210 the digital image of the digitized image side 302 obtained in step 205 is added to the collection of images to be included in the slide show presentation 314. In step 215 the digital images of the non-image side 304, 306, 308 obtained in step 205 are processed to detect handwritten information 310 and 312. A method for detecting handwritten information and machine printing and the area they occupy (bounding box) is disclosed in U.S. Pat. No. 7,072,514. If handwritten information 310, 312 is not detected in step 215, NO for decision box 220, the digital image of the digitized non-image side 306 is deleted in step 225. If handwritten information 310, 312 is detected, YES for decision box 220, the amount of handwritten information 310, 312 is determined in step 230.

The amount of handwritten information 310, 312 can be determined by any suitable method known to those skilled in the art. One simple method can be to measure the area of the bounding rectangular region of the handwritten information 310, 312. Dividing the area of the bounding rectangular region by the area of the entire digital image provides the approximate percentage of the digital image occupied by the handwritten information 310, 312. The percentage can be used as a relative amount of handwritten information 310, 312.

Another simple method to determine the amount of handwritten information 310, 312 can be to segment the foreground (handwritten information) pixels from the background pixels of the bounding rectangular region of the handwritten information 310, 312. The segmentation of the foreground and background pixels can be done using any suitable method known to those skilled in the art. Many image segmentation methods exist and some suitable methods are described in the published book Digital Image Processing, $2^{nd}$ Edition, by Rafael C. Gonzalez and Richard E. Woods, pp. 567-626. Once the foreground handwritten information pixels are segmented, they can be counted and that count can be divided by the total number of pixels in the digital image to provide a percentage of the digital image occupied by the handwritten information. The percentage is used as a relative amount of handwritten information.

Another method to determine the amount of handwritten information 310, 312 can be to first identify the lines of text using a method such as described in U.S. Pat. No. 5,307,422. The amount of handwritten information 310, 312 can be the number of lines identified or the total length of the lines. Finally, the amount of handwritten information 310, 312 is determined in some embodiments as the number of handwritten characters or words, as determined by analysis of the handwriting by such methods as are known in the art of handwriting recognition.

Referring back to FIG. 2, if the amount of handwritten information determined in step 230 is below some user-specified threshold, NO to decision box 235, the digital image of the digitized non-image side 308 is deleted. The user-specified threshold can be empirically determined by measuring the amount of handwritten information 310, 312 on a plurality of digitized non-image side 304, 306, 308 digital images containing varying amounts of handwritten information 310, 312 and then classifying the handwritten information 310, 312 amounts into those with insufficient amounts and those with sufficient amounts. The user-specified threshold can be set to a value that correctly separates the sufficient from insufficient. If the amount of handwritten information 310, 312 determined in step 230 is above or equal to some user-specified threshold, YES to decision box 235, the presentation time is determined in step 245.

The presentation time can be determined by a number of methods. One method can be to base the presentation time on the amount of handwritten information 310, 312 determined in step 230. A table of presentation times with a range of time values from short (e.g. several seconds) to long (e.g. few minutes) and an associated range of handwritten text amounts for each time value. The presentation time can then be determined by finding the table entry for the amount of handwritten information 310, 312 determined in step 230 falls within the range. Preferably, the digital image of the digitized non-image side 304 with a greater amount of handwriting has a presentation time that is longer than the presentation time for the digital image of the digitized non-image side 308 with a smaller amount of handwriting. Another method of determining the presentation time of the digitized non-image sides 304, 306, 308 containing detected handwritten information 310, 312 can be to determine the legibility of the handwriting. A method for automatically estimating the legibility of handwriting is described in "Prediction of Handwriting Legibility" by Dehkordi et al. (Sixth International Conference on Document Analysis and Recognition Proceedings, pp 997-1001, 2001). Preferably, the digital image of the digitized non-image side 304, 306, 308 with less legible handwritten information 310, 312 has a presentation time that is longer than the presentation time for the digital image of the digitized non-image side 304, 306, 308 with more legible handwritten information 310, 312. In other embodiments, when the legibility of the handwriting is below a certain threshold (indicating that it is very difficult to read), then the presentation time is reduced to zero (in effect, deleting the corresponding image of the digitized non-image side 304, 306, 308 of the hardcopy medium 602 from the slideshow presentation). In summary, the present invention automatically determine an order of presentation for producing a slide show video from digital images of digitized image sides 302 and the digital images of digitized non-image sides 304, 306, 308, where either the order of presentation or the presentation time of a digital image is based on detected handwritten information 310, 312.

Figure 4:
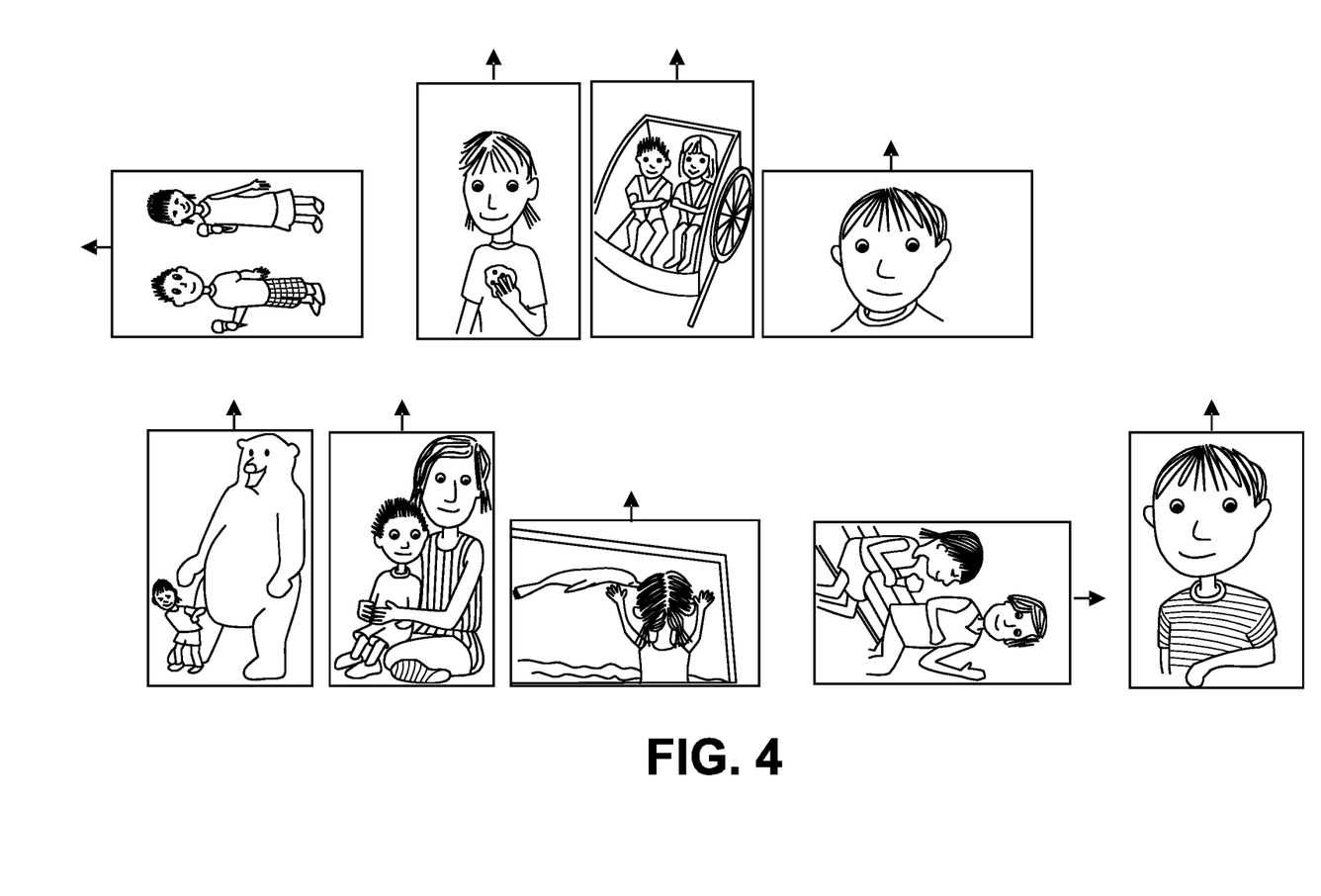
FIG. 4 illustrates the detected orientation of several hardcopy media.

Referring back to FIG. 2, step 250 is performed to determine orientation. In the preferred embodiment, the orientation of both the digital images of the image side and the handwritten information 310, 312 are found. In this description, "orientation" refers to an indication of the direction that is "up" in the image or handwritten information 310, 312. Determining the orientation of a digitized image side 302 of a hardcopy medium 602 is described in U.S. Patent Application Publication No. 20070250529. The orientation of the digitized image side 302 can be found by analyzing the image content; for example, blue skies are often found on the top of an image, and faces are typically oriented in alignment with the image (the top of the face corresponds to the top of the image). In some cases, the configuration of the scanner 604 ensures that the operator will insert the hardcopy medium 602 in a manner so that the orientation is known (e.g. the "up" side of the hardcopy medium 602 is always inserted into the scanner 604). FIG. 4 illustrates the detected orientation of several images and shows the result of the step 250 for determining orientation with an arrow indicating the top of the digitized image.

Figure 5:
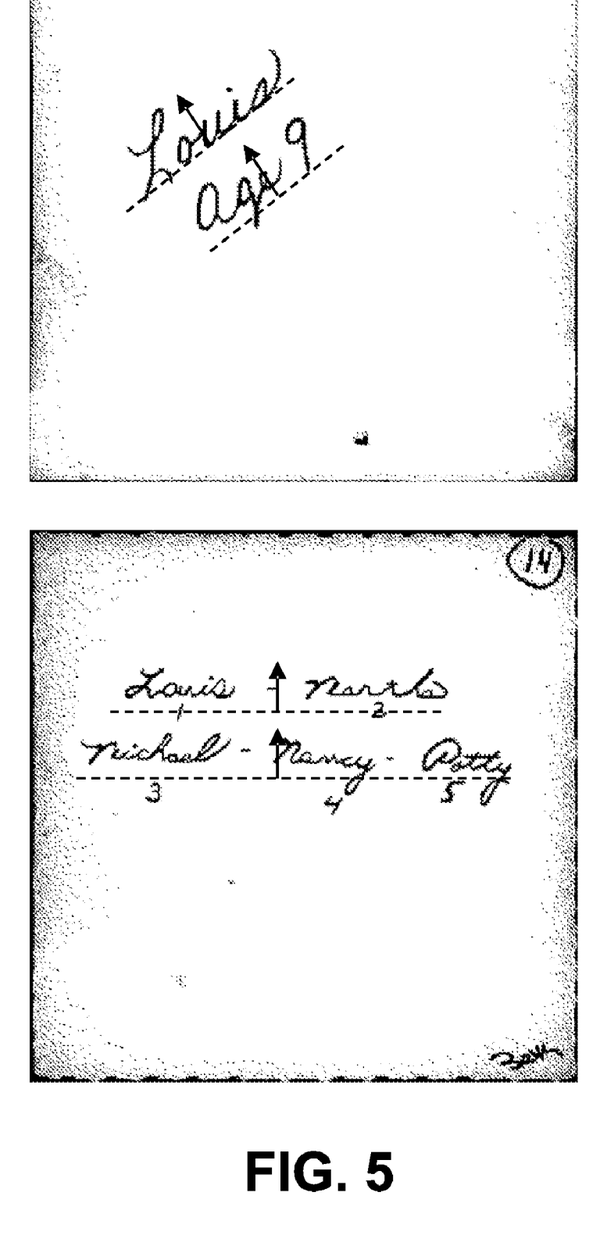
FIG. 5 illustrates an example of handwritten information on the back of two hardcopy media.

The orientation of detected handwritten information 312 is also determined to define the top ("up" direction) of the handwritten information 312. This is accomplished as follows. First, lines of text are found in the handwritten information 312 using any method known in the art. For example, the lines of text are usually parallel to the longer axis of bounding box that surrounds the handwritten information 312. Further, the lines of text can be identified with a method such as described in U.S. Pat. No. 5,307,422. Next, the orientations of the lines of text are determined. For example, the text orientation estimation described by U.S. Pat. No. 7,298,920 can be used. In general, the orientation of text is orthogonal to the direction of the lines of text, so given a line of handwritten information; the orientation of the handwritten information 312 is either "up" or "down". This is accomplished by recognizing that most characters of handwritten text are "bottom heavy". Each line of text in the handwritten information 312 is integrated along the direction of the line of text to create a line profile. The line profile is analyzed to determine the center of mass of the handwritten information 312 and possibly other features (e.g. the mean, the median, and the peak of mass). A classifier is then used to classify the line of handwritten text for is orientation. In the case where multiple lines of text appear near each other, then each line of text is analyzed as described and another classifier is used to determine the overall orientation of the handwritten text block based on the analysis of the line profiles of each line of handwritten text or the classified orientation of each line of handwritten text. FIG. 5 shows example handwritten information 310, 312 on the back of two hardcopy media 602. Each line of handwritten information 310, 312 is shown with a dashed line, and the orientation of the handwritten information 310, 312 is indicated with an arrow. The digital images of the digitized non-image sides 304, 306 and 308 containing handwritten information 310, 312 can be rotated so that the handwritten information 310, 312 is presented in a desired orientation using image processing techniques known to those skilled in the art.

Referring back to FIG. 2, in step 255 the digitized non-image side 304 containing handwritten information 312 is added to the collection of images to be included in the slide show presentation 314. When all digital images obtained in step 205 have been processed, collection of images to be included in the slide show presentation 314 can be converted into a slide show video presentation in any of a number of ways. For example, the video can be created using Microsoft PowerPoint software which permits setting the presentation order of slides (containing images) and the presentation time of each slide.

The result of steps 210 (add image side to slideshow) and 255 (add non-image side to slideshow) is an ordering of the digital images of digitized image sides 302 and the digital images of digitized non-image sides 304, 306, 308 to produce a slideshow with a particular ordering. In general, it is preferable that the particular order to the presentation includes placing a digital image of the digitized non-image side 304, 306, 308 adjacent to the corresponding digital image of the digitized image side 302. In some embodiments, the digital images of digitized non-image sides 304, 306, 308 always precede and are adjacent in ordering the digital images of the corresponding digital images of digitized image sides 304, 306, 308. Practically, this indicates that the viewer will always see the handwritten information 310, 312 that was present on the digitized non-image side 304, 306, 308 of a hardcopy medium 310, 312 after seeing the corresponding image. In other embodiments, the opposite is true (the handwritten annotation is always presented prior to the image side). The user has control over this aspect of the slide show by indicating their preference with the user interface system 130. In addition, the user has the option of selecting a random ordering, where for each image pair (including both a digital image of the digitized image side 302 and the corresponding digitized non-image side 304, 306, 308), the system 100 will randomly select one for presenting first, and the other for presenting next.

The data processing system 110 also determines the ordering of the digital image of the hardcopy media 602 (both the digitized image side 302 and the digitized non-image sides 304, 306, 308). This ordering is preferably dependent on the chronological order of the hardcopy media 602. The data processing system 110 has the ability of estimating the date of a hardcopy medium 602 based on many characteristics (e.g. the tonescale (color or black and white), the format and size, the edge characteristics (whether straight edges, or scalloped), the paper type, watermarks, the corner characteristics (whether sharp or rounded) as described in U.S. Patent Application Publication No. 20070250529. In some embodiments, the estimated or actual date associated with hardcopy medium 602 is used to determine a presentation time for the digital images of the image and non-images sides. For example, it is often preferable to present image sides of older images for a longer duration than the duration used for showing newer images.

It is to be understood that the exemplary embodiment(s) is/are merely illustrative of the present invention and that many variations of the above-described embodiment(s) can be devised by one skilled in the art without departing from the scope of the invention. It is therefore intended that such variations be included within the scope of the following claims and their equivalents.

PARTS LIST

100 System
110 Data Processing System
120 Peripheral System
130 User Interface System
140 Processor-accessible Memory System
200 Method
205 Step
207 Step
210 Step
215 Step
220 Decision Box
225 Step
230 Step
235 Decision Box
245 Step 250 Step
255 Step
300 Set of Digitized Image and Non-Image Sides
302 Digitized Image Side
304 Digitized Non-Image Side
306 Digitized Non-Image Side
308 Digitized Non-Image Side
310 Handwritten Information
312 Handwritten Information
314 Slide Show Image Collection
602 Hardcopy Media
604 Scanner

The invention claimed is:

1. A method of producing a slide show video from a collection of hardcopy media, comprising:
   (a) using a scanner to scan the image sides and the non-image sides of a plurality of hardcopy media from the collection of hardcopy media to produce a collection of digital images of image sides and a corresponding collection of digital images of non-image sides;
   (b) using a processor to detect handwritten information on at least one hardcopy medium by analyzing the digital images of image sides and the digital images of non-image sides;
   (c) using the processor to automatically determine an order of presentation for the slide show video of the digital images of image sides and the digital images of non-image sides, based on the detected handwritten information; and
   (d) producing a slide show video from the digital images of the image sides and the digital images of non-image sides using the determined order of presentation, wherein step (d) further includes editing the slide show video so that there is a particular order to the presentation of digital images of image sides and digital images of non-image sides, and the particular order to the presentation includes placing a digital image of the non-image side adjacent to the corresponding digital image of the image side.

2. The method of claim 1 further including identifying digital images of non-image sides without handwritten information and excluding them prior to step (d).

3. The method of claim 2 further including determining the quantity of handwritten information and excluding non-image sides with insufficient quantity of handwritten information.

4. A method of producing a slide show video from a collection of hardcopy media, comprising:
   (a) using a scanner to scan the image sides and the non-image sides of a plurality of hardcopy media from the collection of hardcopy media to produce a collection of digital images of image sides and a corresponding collection of digital images of non-image sides;
   (b) using a processor to estimate the age of at least one hardcopy medium by analyzing the digital images of image sides and the digital images of non-image sides;
   (c) using the processor to automatically determine an order of presentation for the slide show video of the digital images of image sides and the digital images of non-image sides, based on the estimated ages; and
   (d) producing a slide show video from the digital images of the image sides and the digital images of non-image sides using the determined order of presentation, having a presentation time based on the determined age of the hardcopy media.

5. A method of producing a slide show video from a collection of hardcopy media, comprising:
   (a) using a scanner to scan the image sides and the non-image sides of a plurality of hardcopy media from the collection of hardcopy media to produce a collection of digital images of image sides and a corresponding collection of digital images of non-image sides;
   (b) using a processor to detect handwritten information on at least one hardcopy medium by analyzing the digital images of image sides and the digital images of non-image sides;
   (c) using the processor to automatically determine an order of presentation for the slide show video of the digital images of image sides and the digital images of non-image sides, based on the detected handwritten information; and
   (d) producing a slide show video from the digital images of the image sides and the digital images of non-image sides using the determined order of presentation, wherein the slide show video includes frames produced by compositing a digital image of an image side with its corresponding digital image of a non-image side.

6. A method of producing a slide show video from a collection of hardcopy media, comprising:
   (a) using a scanner to scan the image sides and the non-image sides of a plurality of hardcopy media from the collection of hardcopy media to produce a collection of digital images of image sides and a corresponding collection of digital images of non-image sides;
   (b) using a processor to detect handwritten information on at least one hardcopy medium by analyzing the digital images of image sides and the digital images of non-image sides;
   (c) using the processor to automatically determine an order of presentation for the slide show video of the digital images of image sides and the digital images of non-image sides, based on the detected handwritten information; and
   (d) producing a slide show video from the digital images of the image sides and the digital images of non-image sides using the determined order of presentation, including determining the presentation time for each frame of the video slide show based on a determined quantity of handwritten information.

7. A method of producing a slide show video from a collection of hardcopy media, comprising:
   (a) using a scanner to scan the image sides and the non-image sides of a plurality of hardcopy media from the collection of hardcopy media to produce a collection of digital images of image sides and a corresponding collection of digital images of non-image sides;
   (b) using a processor to detect handwritten information on at least one hardcopy medium by analyzing the digital images of image sides and the digital images of non-image sides;
   (c) using the processor to automatically determine an order of presentation for the slide show video of the digital images of image sides and the digital images of non-image sides, based on the detected handwritten information; and
   (d) producing a slide show video from the digital images of the image sides and the digital images of non-image sides using the determined order of presentation, including determining the presentation time for each frame of the video slide show based on a determined legibility of the handwritten information.

* * * * *